Figure 1:
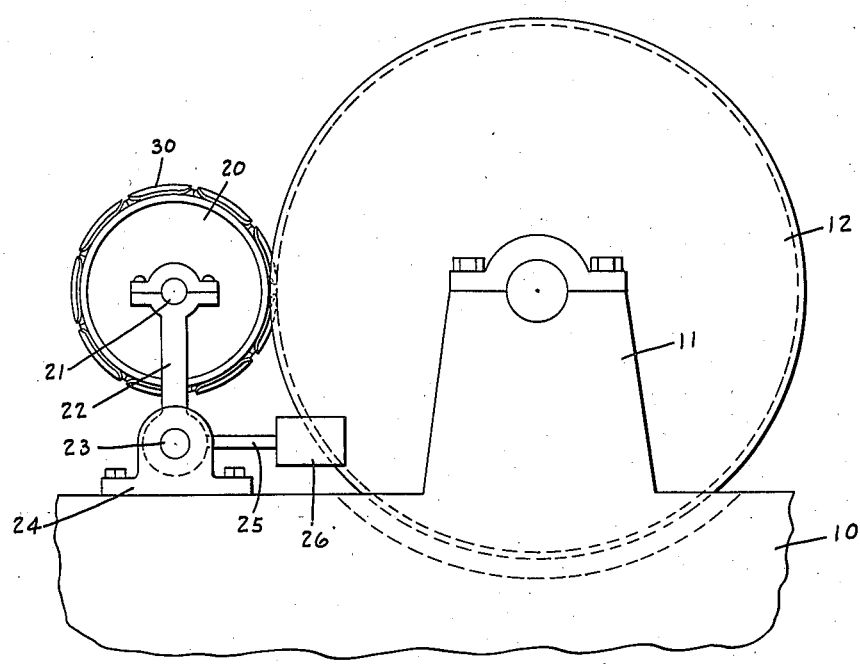

L. W. BUGBEE.
TORIC LENS SERIES AND PROCESS OF MAKING SAME.
APPLICATION FILED NOV. 26, 1920.

1,426,147.

Patented Aug. 15, 1922.
4 SHEETS—SHEET 1.

INVENTOR.
LUCIAN W. BUGBEE.
BY
ATTORNEYS.

L. W. BUGBEE.
TORIC LENS SERIES AND PROCESS OF MAKING SAME.
APPLICATION FILED NOV. 26, 1920.
1,426,147.
Patented Aug. 15, 1922.
4 SHEETS—SHEET 2.
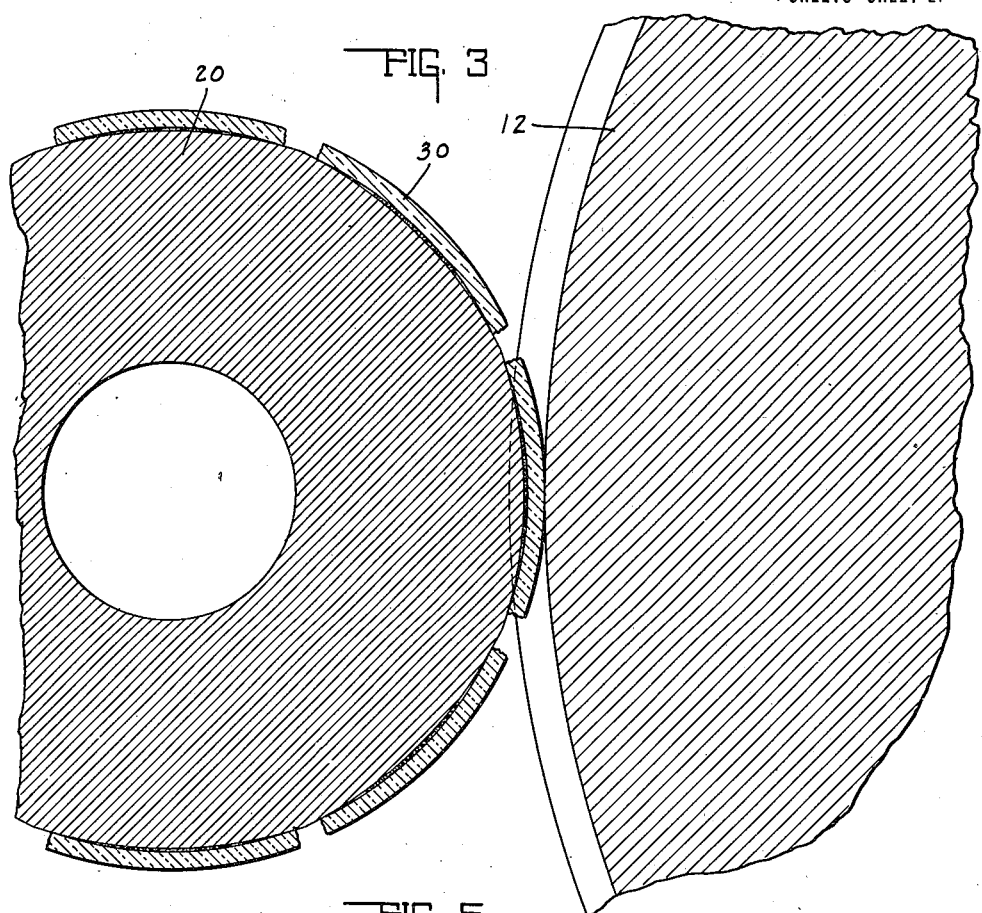
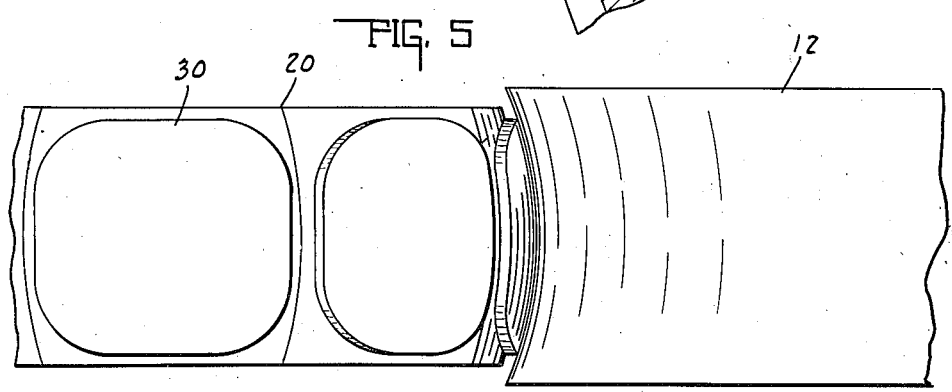
INVENTOR.
LUCIAN W. BUGBEE.
BY
ATTORNEYS.

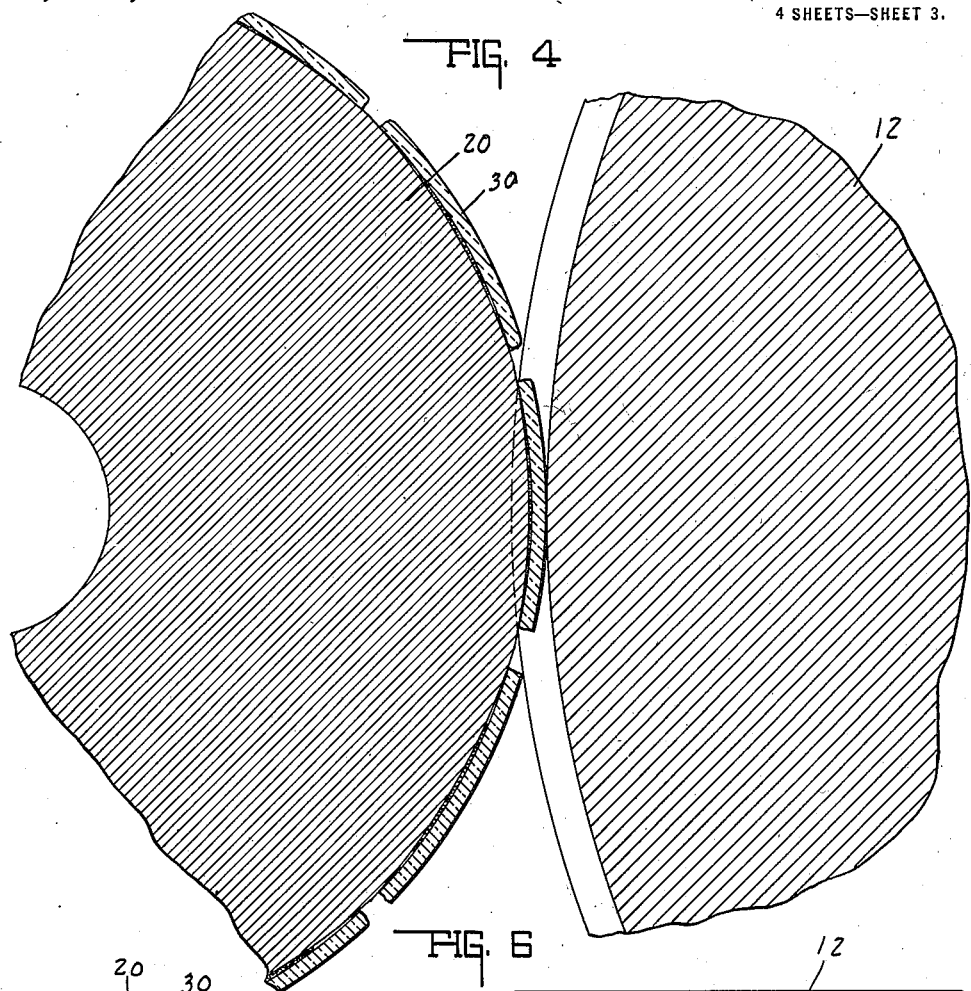
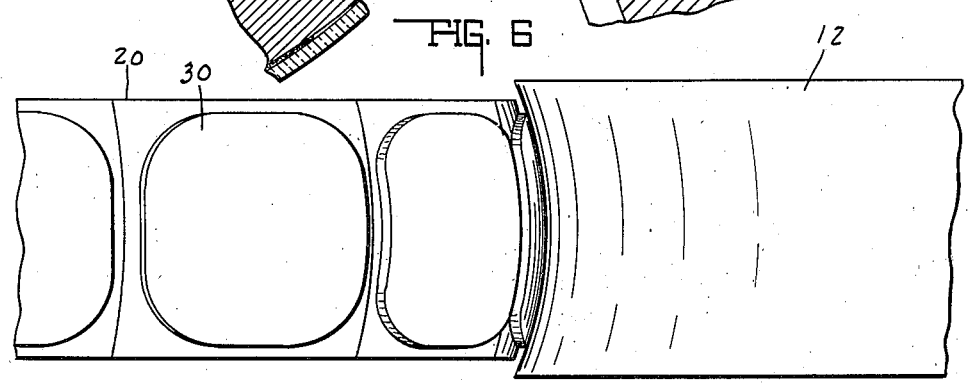

L. W. BUGBEE.
TORIC LENS SERIES AND PROCESS OF MAKING SAME.
APPLICATION FILED NOV. 26, 1920.
1,426,147.
Patented Aug. 15, 1922.
4 SHEETS—SHEET 4.
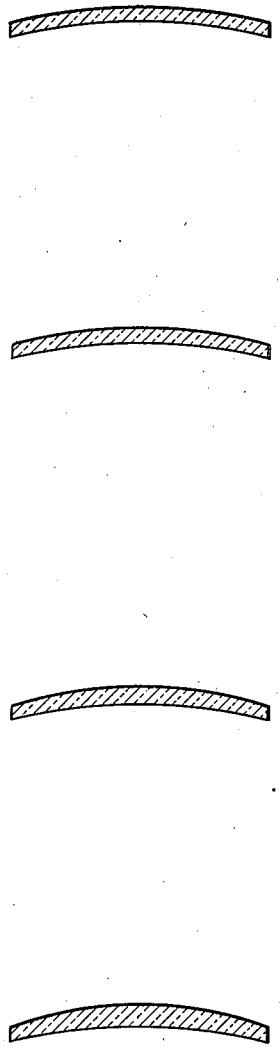
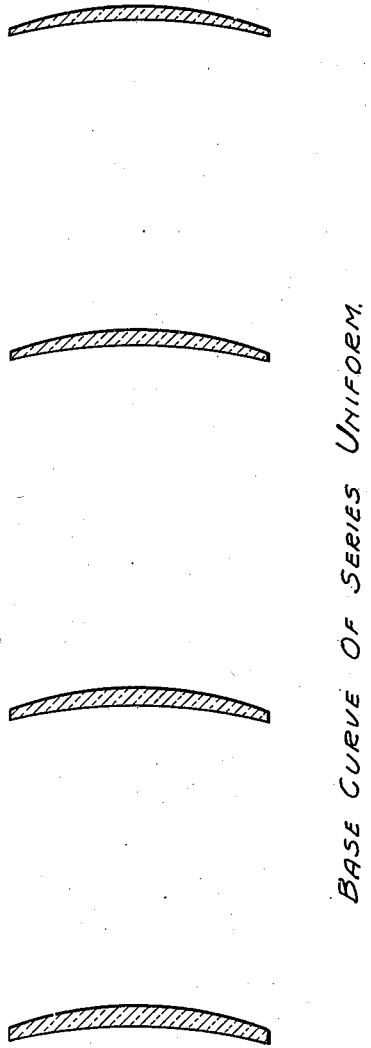
FIG. 7
INVENTOR.
LUCIAN W. BUGBEE.
BY
ATTORNEYS.

UNITED STATES PATENT OFFICE.

LUCIAN W. BUGBEE, OF INDIANAPOLIS, INDIANA, ASSIGNOR TO ONEPIECE BIFOCAL LENS COMPANY, OF INDIANAPOLIS, INDIANA, A CORPORATION.

TORIC-LENS SERIES AND PROCESS OF MAKING SAME.

1,426,147. Specification of Letters Patent. Patented Aug. 15, 1922.

Application filed November 26, 1920. Serial No. 426,562.

*To all whom it may concern:*

Be it known that I, LUCIAN W. BUGBEE, a citizen of the United States, and a resident of Indianapolis, county of Marion, and State of Indiana, have invented a certain new and useful Toric-Lens Series and Process of Making Same; and I do hereby declare that the following is a full, clear, and exact description thereof, reference being had to the accompanying drawings, in which like numerals refer to like parts.

This invention relates to a series of ophthalmic lenses of toric type having a constant base curve on the concave sides thereof and the convex surfaces thereof being toric with a constant meridional curvature and substantially the same power in the meridional curvature and with varying equatorial curvatures, and the process of making the same.

The invention also includes a specific series of such lenses herein illustrated wherein the marginal thickness of the lenses in their meridional curvatures varies according to the variations of the equatorial curvatures. In other words, the equatorial curvatures gradually increase or diminish and the less the equatorial curvature, the less is the thickness of the central part of the lenses, while the marginal thicknesses of the lenses on the meridional curvature increase or decrease according to the increase or decrease of the equatorial curvature.

The process of making said toric lens series consists first in forming on the concave sides of said lenses a uniform base curvature, say, of six dioptrics, and afterwards grinding and finishing the convex surfaces in toric form with the characteristics above mentioned. The invention particularly consists in mounting the lens blanks of the series with said concave sides secured upon the periphery of spotting wheels of varying diameters and grinding the toric surfaces with grinding tools or stones for giving to the same a constant meridional curvature, and maintaining a substantially uniform thickness of the lenses at the margin in equatorial curvatures. Therefore, as the equatorial curvature diminishes, the thickness of the central part of the lens will diminish and the thickness of the margins in the meridional curvatures will diminish, substantially as shown.

Figure 2:
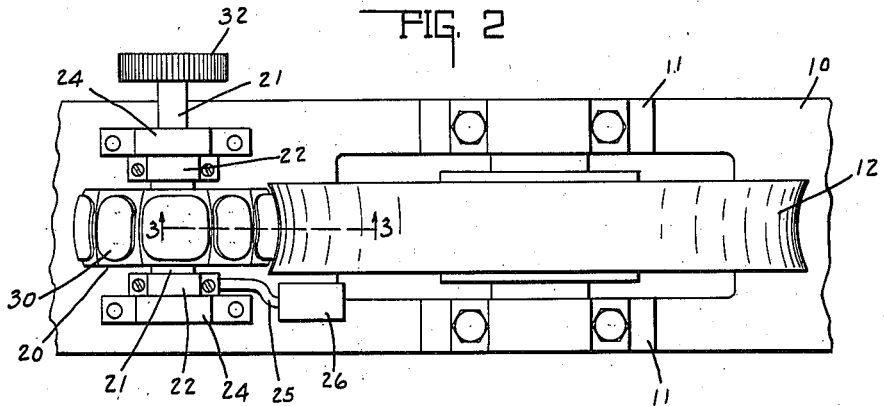

The full nature of the invention will be understood from the accompanying drawings and the following description and claims:

In the drawings, Fig. 1 is a side elevation of means which may be employed for carrying out the process herein set forth and for making the series of toric lenses constituting this invention, the lower parts of the machine being broken away. Fig. 2 is a plan view of Fig. 1. Fig. 3 is a vertical section of a portion of Fig. 1 on an enlarged scale and on the line 3—3 of Fig. 2. Fig. 4 is a similar section with lenses of the same thickness, as in Fig. 3, but with a spotting wheel of greater diameter than in Fig. 3, and with a grinding wheel of the same transverse curvature. Fig. 5 is a plan view of a portion of Fig. 3. Fig. 6 is a similar view of Fig. 4. Fig. 7 illustrates sections through the series of toric lenses made according to the process set forth herein, the upper row showing the "spheres" or equatorial curvatures and the lower row showing the "cylinders" or meridional curvatures of the same lenses.

In the drawings, 10 is the table of a machine with an oppositely located pair of posts 11 in which a grind stone 12 or other suitable grinder for ophthalmic lenses is mounted so as to rotate. The periphery of the grind stone has a concave transverse curvature adapted to grind the lenses so as to give to them the predetermined cylinder or meridional curvature. The means for rotating the grinder 12 is not shown, as mechanism for rotating the same is well known in the art.

A spotting wheel 20 is mounted on an arbor 21 carried by a pair of supports 22 pivoted at their lower ends on a pivot shaft 23 in the bearing blocks 24 secured to the table 10 adjacent the periphery of the grind stone. A weighted arm 25 is rigidly connected with the pivot shaft 23 and extends towards the grind stone and has a weight 26 on its outer end. The weighted arm yieldingly forces the spotting wheel towards and in engagement with the periphery of the grind stone, and said grind stone and spotting wheel are tangential of each other, as is more fully presented and explained in my former application Serial No. 276,539, filed February 12, 1919, for lens grinding machine.

The spotting wheel is made of metal and rectangular seats are cut in the periphery of the wheel to receive the lens blanks 30 thereon. A gear 32 is secured on the shaft 21 to which power is transmitted for rotating the spotting wheel.

The first step in the process consists in grinding and finishing the concave sides of the lens blanks to the desired base curvature, say, six dioptrics. Then the blanks are secured accurately and uniformly on the spotting wheel so that their anterior sides will be ground by the grind stone 12, as the machine is operated.

The sphere or equatorial curvature will be predetermined by the diameter of the spotting wheel used and the thickness of the lenses or blanks secured thereon, that is, by the distance from the axis of the spotting wheel to the outer surfaces of the lenses or blanks. An increase in the radius of the spotting wheel will cause a corresponding decrease in the equatorial curvature and the thicker the lenses secured upon a certain spotting wheel the less will be said equatorial curvature.

In carrying out this process, a series of spotting wheels of gradually increasing or diminishing diameters is employed, but a single grinding wheel or element or grinding wheels or elements having a constant transverse curvature are used. Thus, as shown in Figs. 2 and 3, the grindstone or element has a certain transverse curvature which would give a certain cylinder or meridional curvature to the lenses ground. This curvature is the same also in the construction shown in Fig. 4 and is constant in making this series of lenses. On the other hand, the diameter of the spotting wheel 12, shown in Figs. 3 and 4, is varied, that shown in Fig. 4 being greater than that shown in Fig. 3, which will cause the lenses ground on the spotting, shown in Fig. 4, to have a less equatorial curvature than those shown on the spotting wheel in Fig. 3, but the lenses on both of said spotting wheels in Figs. 3 and 4 will have the same meridional curvature as shown in Figs. 5 and 6.

The specific series of lenses illustrated in Fig. 7 is formed by the means herein before described with spotting wheels having varying diameters, but with grinding elements having constant transverse curvatures located so as to be tangential of the series of lenses on the spotting wheels and, therefore, the spotting wheel and the grind stone are both rotated so as to bring about said tangential operation. The series of lenses shown in Fig. 7 have uniform marginal thickness in the equatorial curvatures. Therefore, as the spotting wheels are increased in diameter, the gradual lessening of the equatorial curvature will produce lenses gradually lessening in thickness at the center and gradually lessening in the margins of the meridional curvatures. These characteristics are illustrated in Fig. 7, wherein there is a section of a lens through the equatorial curvature shown in the upper row and a section of the same lens in the meridional curvature shown below it. Hence, there are four lenses illustrated in Fig. 7, the upper row being sections on equatorial curvatures, and the lower row being sections of the meridional curvatures of the corresponding lenses above. It is noted that the marginal thickness of the lenses in the equatorial curvature in the upper row is uniform and the lenses have substantially the same power in the meridional curvature while the equatorial curvatures decrease from left to right, and also the thickness of the center of the lenses decreases from left to right and also the thickness of the margins of the meridional curvatures in the lower series decreases from left to right.

Hence, in this specific series of lenses, the equatorial curvatures vary according to the variations in the diameters of the radii in the spotting wheels with the thickness of the glass added, and substantially as the marginal thickness of the lenses in the equatorial curvature while all the other measurements of the lenses remain constant.

The series of lenses produced by said process all have the same base and meridional curvatures and substantially the same lens power in the meridional curvature, within commercial or theoretical limits, as a necessary result of the process. They vary in equatorial curvatures and in thickness. The marginal thicknesses in the meridional curvatures vary substantially the same as the equatorial curvatures vary.

The invention claimed is:

1. A toric lens series having a constant base curve on the concave sides thereof and toric surfaces on the convex sides thereof with one curvature thereof varying and the other curvature thereof being constant and the lenses having substantially the same power in the constant toric curvature.

2. A toric lens series having a constant base curve on the concave sides thereof and toric surfaces on the convex sides thereof with a constant meridional curvature and substantially the same power in the meridional curvature and with varying equatorial curvatures.

3. A toric lens series having a constant base curve on the concave sides thereof and toric surfaces on the convex sides thereof with a constant meridional curvature and substantially the same power in the meridional curvature and with varying equatorial curvatures, and the thickness of the lenses at the center varying according to the equatorial curvatures.

4. A toric lens series having a constant base curve on the concave sides thereof and toric surfaces on the convex sides thereof with a constant meridional curvature and substantially the same power in the meridional curvature and with varying equatorial curvatures, and the thickness of the lenses in their meridional curvatures varying according to the equatorial curvatures.

5. A toric lens series having a constant base curve on the concave sides thereof and toric surfaces on the convex sides thereof with a constant meridional curvature and substantially the same power in the meridional curvature and with varying equatorial curvatures and the marginal thickness of the lenses in the equatorial curvatures being constant.

6. A toric lens series having a constant base curve on the concave sides thereof and toric surfaces on the convex sides thereof with a constant meridional curvature and substantially the same power in the meridional curvature and with varying equatorial curvatures and the marginal thickness of the lenses in the equatorial curvatures being constant, and the thickness of the lenses at the center varying according to the equatorial curvatures.

7. The process of making a toric lens series, which process consists in first grinding the concave side thereof with a constant curvature, mounting the same upon spotting wheels of varying diameters, and applying a grinding element to the exterior surfaces of the lenses for giving them a constant meridional curvature, whereby the equatorial curvatures of the lenses will vary and the lenses will have substantially the same power in the meridional curvature.

8. The process of making a toric lens series, which process consists in first grinding the concave side thereof with a constant curvature, mounting the same upon spotting wheels of varying diameters, applying a grinding element to the exterior surfaces of the lenses for giving them a constant meridional curvature, and maintaining a substantially uniform thickness of the lenses in the margins in the equatorial curvatures, whereby the thickness of the lenses at the center and margins in the meridional curvature will vary according to the variations of the equatorial curvature and the lenses will have substantially the same power in the meridional curvature.

In witness whereof, I have hereunto affixed my signature.

LUCIAN W. BUGBEE.